(12) United States Patent
Weinblatt

(10) Patent No.: US 7,660,982 B1
(45) Date of Patent: Feb. 9, 2010

(54) SUBSCRIPTION BROADCAST SECURITY SYSTEM

(76) Inventor: Lee S. Weinblatt, 38 Franklin St., Tenafly, NJ (US) 07670

( * ) Notice: Subject to any disclaimer, the term of this patent is extended or adjusted under 35 U.S.C. 154(b) by 706 days.

(21) Appl. No.: 10/704,181

(22) Filed: Nov. 7, 2003

Related U.S. Application Data

(60) Provisional application No. 60/450,525, filed on Feb. 27, 2003, provisional application No. 60/454,578, filed on Mar. 14, 2003.

(51) Int. Cl.
*H04L 29/06* (2006.01)
*H04N 7/167* (2006.01)

(52) U.S. Cl. .................. 713/163; 380/210; 380/238; 726/31

(58) Field of Classification Search ............... 713/163; 725/27, 31; 380/210, 238
See application file for complete search history.

(56) References Cited

U.S. PATENT DOCUMENTS

| | | | |
|---|---|---|---|
| 4,636,851 A | 1/1987 | Drury | |
| 4,761,808 A * | 8/1988 | Howard | 379/93.02 |
| 4,815,129 A | 3/1989 | Griffin | |
| 4,864,615 A | 9/1989 | Bennett | |
| 4,887,296 A * | 12/1989 | Horne | 380/239 |
| 5,101,432 A | 3/1992 | Webb | |
| 5,243,650 A | 9/1993 | Roth | |
| 5,426,701 A | 6/1995 | Herrmann | |
| 5,642,418 A | 6/1997 | Farris | |
| 5,659,618 A | 8/1997 | Takahashi | |
| 5,715,315 A | 2/1998 | Handelman | |
| 5,740,246 A | 4/1998 | Saito | |
| 5,878,134 A | 3/1999 | Handelman | |
| 5,943,422 A * | 8/1999 | Van Wie et al. | 705/54 |
| 6,097,816 A | 8/2000 | Momiki | |
| 6,145,081 A * | 11/2000 | Winograd et al. | 726/33 |
| 6,266,812 B1 | 7/2001 | Yu | |
| 6,272,635 B1 | 8/2001 | Saito | |
| 6,289,314 B1 | 9/2001 | Matsuzaki | |
| 6,498,851 B1 | 12/2002 | Wong | |
| 6,526,508 B2 | 2/2003 | Akins, III | |
| 6,721,437 B1 * | 4/2004 | Ezaki et al. | 382/100 |
| 7,159,118 B2 * | 1/2007 | Petrovic | 713/176 |
| 2002/0044658 A1 * | 4/2002 | Wasilewski et al. | 380/239 |
| 2002/0097873 A1 * | 7/2002 | Petrovic | 380/238 |
| 2002/0140857 A1 * | 10/2002 | Limaye | 348/515 |
| 2003/0034909 A1 | 2/2003 | Wong | |
| 2003/0074565 A1 | 4/2003 | Wasilewski | |

* cited by examiner

*Primary Examiner*—Kimyen Vu
*Assistant Examiner*—Suman Debnath
(74) *Attorney, Agent, or Firm*—Howard Natter; Natter & Natter

(57) ABSTRACT

A subscription broadcast security system for preventing theft of an encrypted program datastream utilizes an encryption protocol with steganographic supplementation. A decoder includes a decryption chip containing numerous decryption codes and an ID chip having a continually changing unique identification code for authenticating subscriber access. The ID chip and the decryption chip each receive decoding instructions through a combination of hidden data in the audio signal and from service provider communication directly with the ID chip.

8 Claims, 2 Drawing Sheets

SUBSCRIPTION BROADCAST SECURITY SYSTEM

REFERENCE TO PRIOR PROVISIONAL APPLICATIONS

This application claims the benefit to priority under 35 U.S.C. §119 (e) based on U.S. Provisional Application Ser. No. 60/450,525, filed Feb. 27, 2003 and U.S. Provisional Application Ser. No. 60/454,578, filed Mar. 14, 2003 both filed under 35 U.S.C. §111(b).

BACKGROUND OF THE INVENTION

1. Field of the Invention

This invention relates generally to encryption technology and especially to encryption of video and/or audio broadcast signals.

In particular, the subscription broadcast system of this invention concerns an encryption protocol with steganographic supplementation.

2. Background Information

Service distribution organizations, such as cable and satellite providers, broadcast television and/or radio programs intended for reception by only those subscribers who have paid for the respective service. Conditional access to pay-TV broadcast signals is generally maintained by encryption and/or scrambling techniques. Subscribers who purchase these services usually receive a set-top terminal or "box" from the service provider. The set-top terminal is essentially a microprocessor that contains an integrated circuit chip programmed for decoding the incoming encrypted audio/video signals.

A problem with this security arrangement is that the set-top terminal is subject to theft and can then distributed to unauthorized users. Another shortcoming is that the encrypted signals entering the set-top terminal can be analyzed for determining the encryption algorithm. The decoding "chip" can then be duplicated so as to bypass the service provider set-top terminal for illegally accessing the broadcast signals.

Another technique for restricting access to encrypted signals is through an addressable set-top terminal and by assigning a unique personal identification code to the subscriber. The identification code provides authentication of the subscriber, and is transmitted from the set-top terminal to the service provider. If the identification code confirms that the subscriber is entitled to receive the program, the set-top terminal receives an approval signal from the service provider for programming the terminal to decrypt the signal. A deficiency of this security mechanism is that by bombarding the decoder "chip", in a brute force attack with many different signals, it is possible to discover the approval signal. In a modified format, the identification code is continually being changed e.g. by a clock signal, however this system can be defeated by disabling the timing signal generator.

Some cable and satellite providers use electronic "smart cards" to control subscriber access. The "smart cards" typically plug into a card reader slot located in the set-top terminal. The "smart cards" contain an integrated circuit chip that holds the "key" that unlocks the encryption algorithm. U.S. Pat. Nos. 5,878,134, and 5,426,701 describe some of these devices. A limitation of decryption cards is that they are readily "broken" by pirates and duplicated or often stolen for unauthorized decryption.

Encryption/decryption techniques have been developed that utilize a combination of encrypted signals, such as shown in U.S. Pat. Nos. 5,243,650 and 4,636,851. A deficiency of many of these systems is that the decryption code is continually being transmitted thus subjecting the code to be more readily detected, intercepted and deciphered.

BRIEF SUMMARY OF THE INVENTION

Briefly, the subscription broadcast security system of this invention is directed to a method and apparatus for preventing the previously discussed theft of audio and video broadcast signals. The apparatus of this invention concerns an encryption system having an encoder, an encryptor, a transmitter, a receiver, a decoder, and a management control unit. The method of this invention encompasses the encoding of inaudible decoding instructions within the audio signal, encrypting the audio and video signals, transmitting the encrypted audio and video signals to a subscriber receiver, decrypting the audio and video signals using a decoder having a personal ID chip with a unique subscriber identification code that is programmed to constantly change, for example, in response to a timing or clock signal, and a decryption chip that is programmed with numerous decryption codes that can be selectively accessed.

The ID chip and the decryption chip each receive decoding instructions through a combination of hidden data in the encrypted audio signal and from the management control unit which communicates digitally directly with the ID chip; the ID chip, in turn, inputs data to the decryption chip for implementing the decryption code selection and/or activation. The ID chip and the decryption chip are functionally co-dependent and can be incorporated in a single chip.

Furthermore, since the ID chip requires input from the encoded audio signal in combination with the digital transmitted data, a "brute force" attack to "unlock" the ID chip will be ineffective because it can only provide the digital decoding component; the component transmitted through the audio signal is hidden and cannot be detected.

It should also be apparent that if the ID chip is bypassed the decryption chip will lack data input from the ID chip and thus will be ineffective.

If the ID chip timing or clock signal is cut-off or "frozen", so as to prevent changing identification codes, the ID chip will deactivate since it is programmed not to operate without receiving a clock signal.

Additionally, any attempt to duplicate the decryption chip will also be unsuccessful for the reason the decryption codes are continually changing. It should also be noted that decryption code selection is obtainable from dual decoding signal sources and therefore it is almost impossible to intercept and replicate.

Another aspect of this invention is the service provider management control unit which contains a database for matching decoding instructions with the corresponding identification code and the decryption code and for directly communicating with the ID chip in response to authorized requests for service.

Having thus summarized the invention, it will be seen that it is an object thereof to provide a subscription broadcast security system of the general character described herein which is not subject to the aforementioned limitations, shortcomings, and deficiencies.

With these ends in view, the invention finds embodiment in certain combinations of elements and arrangement of components for which the aforementioned objects and certain other objects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown an exemplary embodiment of the invention.

DETAILED DESCRIPTION OF THE INVENTION

Figure 1:
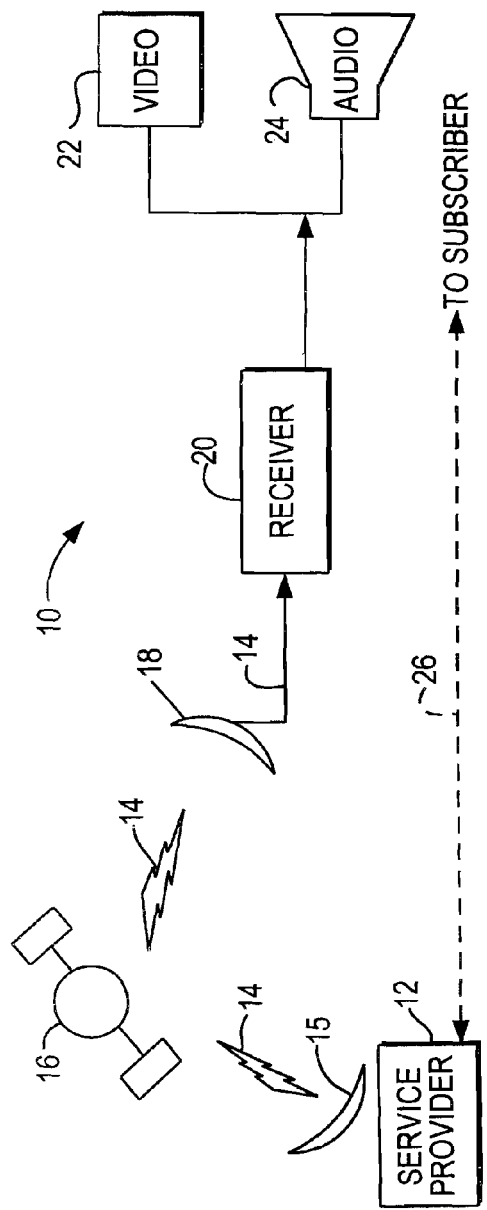
FIG. 1 is a schematic block diagram illustrating a subscription broadcast security system in accordance with this invention.

Referring now in detail to the drawings, and in particular to FIG. 1, the reference numeral 10, denotes generally a subscription broadcast security system in accordance with this invention. The security system 10 is particularly adapted for pay-TV programming delivered by terrestrial, satellite, or cable transmission.

By way of overview, a service provider 12 typically originates an encrypted program datastream 14 from an uplink facility for broadcast from a transmitter 15. For the purpose of this discussion, the program datastream 14 is uplinked to a satellite 16 and then downlinked to a subscriber receiving dish antenna 18 for reception at a digital receiver 20. The program datastream 14 must be decrypted to provide a perceptible video signal at a monitor 22 and an audio signal at a speaker 24. A management aspect of this security system which will be described in further detail hereinafter, includes a communication link 26 between the service provider 12 and subscriber for processing subscription orders and for controlling decryption access. The link 26 may, for example, be by telephone line, pager, or cable, and can include two-way communication.

Figure 2:
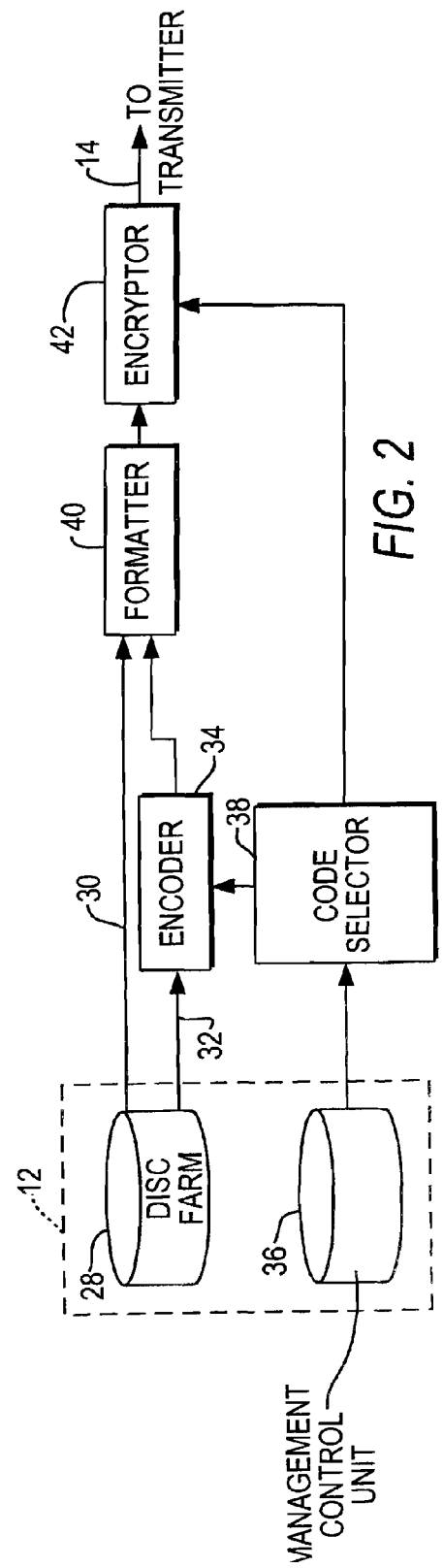
FIG. 2 is a schematic block diagram illustrating encryption at a broadcast source including encoding, encrypting, and transmitting a program datastream.

The encryption of the program datastream 14 will be described in further detail with reference to FIG. 2. In this schematic diagram, a television program source 28, such as a "disc farm" of stored video programs generates a digital video signal 30 and an analog audio signal 32 for transmission and reception using conventional standards.

In accordance with the security system of this invention, decoding instructions are concealed in the audio signal 32 using steganographic techniques, such as by replacing bits of data with bits of different invisible information, placing signal data in an undetectable frequency range or alternative methods. The resultant embedded decoding instructions are transparently inaudible and do not affect sound quality. Furthermore, the hidden decoding instructions are recoverable from the audio signal 32 and survivable after data compression, decompression and other signal processing. A management control unit 36 coordinates the decoding instructions with the encryption program in current usage and communicates this information through a code selector 38. The code selector 38 directs an encoder 34 to embed the appropriate instructions within the audio signal 32.

The resultant encoded audio signal 32 is digitized and combined with the video signal 30 for processing by a formatter 40, using known compression and decompression methods for audio/video processing and storage applications, such as the Moving Pictures Expert Group (MPEG) standard. The respective audio and video signals 30, 32 are then encrypted by an encryptor 42. The encryptor 42 receives instructions from the management control unit 36, through the code selector 38, for determining the cryptosystem algorithm to use for encryption. The encrypted datastream 14 is then broadcast using conventional transmission equipment for reception at the subscriber digital receiver 20.

Figure 3:
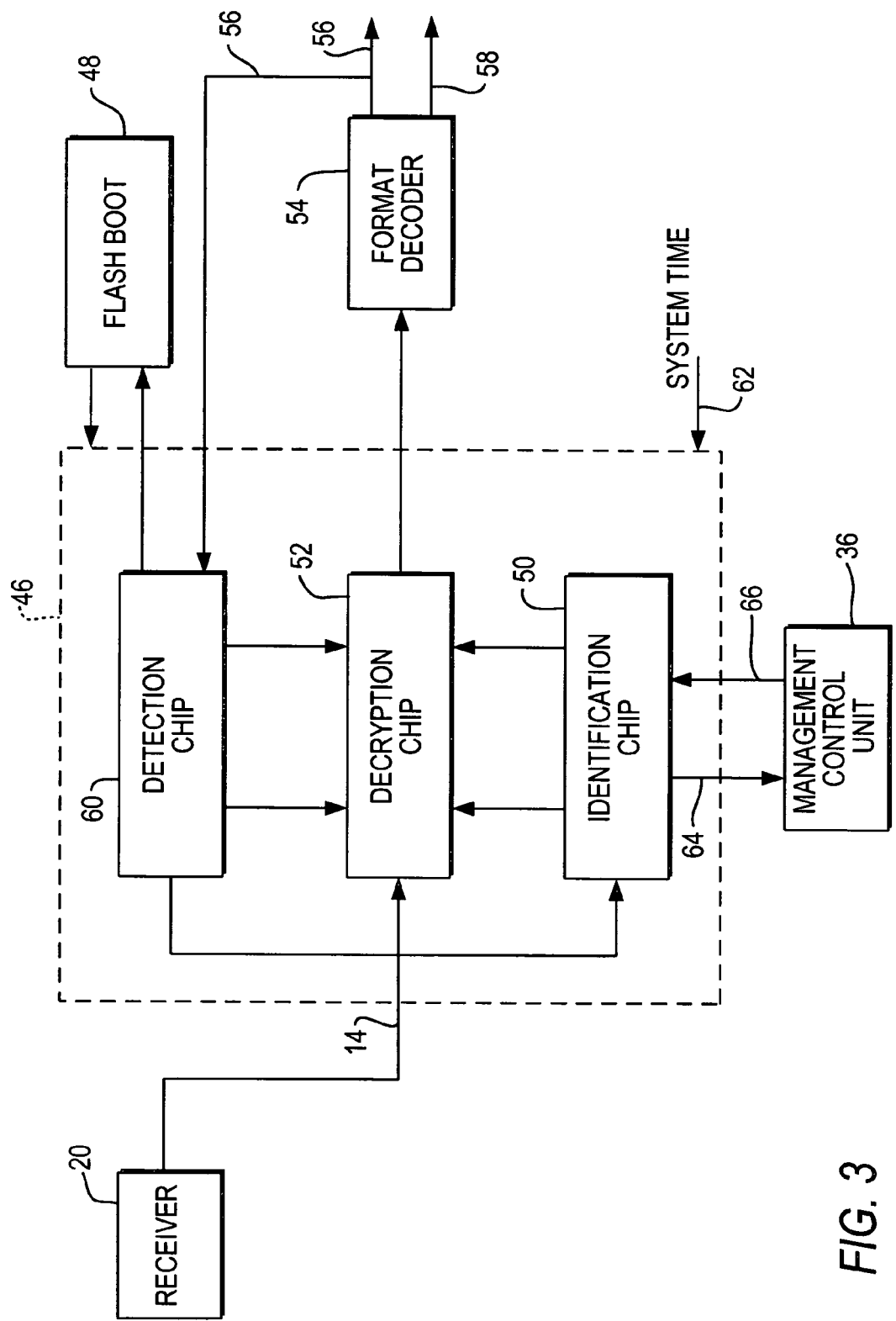
FIG. 3 is a schematic block diagram showing decrypting of the program datastream at a subscriber decoder.

The decryption will now be discussed with reference to FIG. 3. A decoder 46, such as a field-programmable gate array, provides a logic network for decoding the encrypted datastream 14. The decoder 46 may be integrated into the receiver 20. The operating system for the decoder 46 is initialized by a flash boot 48. The decoder 46 includes a personal identification chip 50, also referred to as ID chip 50, programmed with an identification code that is unique for each subscriber and further adapted to reconfigure or reset some binary digits (bits) so as to change the unique identification code either at a fixed or at a programmed-timed sequence to provide a constantly changing or "morphing" identification code. The ID chip 50 preferably relies upon a sensor to detect a clock signal for the timed code changes.

The decoder 46 also contains a decryption circuit chip 52 programmed with numerous changeable decryption codes that require the input of binary digits (bits) from the ID chip 50 to be functionally operative.

The management control unit 36 permits the encrypted program datasteam 14 to be initially processed by the decryption chip 52. The datastream 14 is then directed to a format decoder 54 providing a decoded audio output signal 56 and a decoded video signal 58. The audio signal 56, containing the embedded decoding instructions, is redirected to a detection chip 60 that is programmed to recognize the embedded decoding instructions in the audio signal 56 and in response thereto to transmit "missing" binary digits (bits) to the ID chip 50 to complete the identification code. Alternatively, the data transmitted by the detection chip 60 can be used to reconfigure or reset the identification code. The detection chip 60 will also transmit "missing" binary digits (bits) to complete the decryption code in the decryption chip 52. The data transmitted can also be used to reset the decryption code or select a particular decryption code within the decryption chip 52. Independently or in combination with the above, the ID chip 50 and the decryption chip 52 may also be program-controlled by a sensor that detects a clock signal for reconfiguring the respective chips 50, 52 as a function of system time 62. Furthermore, the embedded instructions received through the audio signal 56 may also be processed by the detection chip 60 for reconfiguring, changing, or erasing the program in the flash boot 48.

In operation, the management control unit 36, will receive a request for service signal 64 from the ID chip 50, via the link 26, with the subscriber's identification code; a determination is made, for example, by comparison with an internal computerized database maintained by the management control unit 36, whether the subscriber is authorized to receive the program datastream 14. Upon confirmation, the management control unit 36 will then send an "OK" or approval signal 66 to the ID chip 50. As a precautionary measure, if the return approval signal 66 is not received by the ID chip 50 within a fixed time frame from initial transmission of the signal 64, the ID chip 50 is programmed to deactivate.

The approval signal 66 digitally transmits information to the ID chip 50, necessary for the decoding, and as previously mentioned, the ID chip 50 will communicate to the decryption chip 52 the "missing" binary digits (bits) required to complete the respective decryption code or code selection.

It should also be apparent that the management control unit 36 is coordinated to send the appropriate embedded audio and approval signals corresponding to the respective decryption code and identification code programmed in the decoder 46. As an additional anti-theft measure, in an alternate embodiment, after the ID chip 50 receives a first approval signal 66, the ID chip 50 is programmed to send back an acceptance code and thereafter a second and different approval signal is transmitted to the chip ID 50. This is intended as a further deterrent to any illegal attempts to bypass the ID chip 50.

It should thus be seen that there is provided a subscription broadcast security system which achieves the various objects of this invention and which is well adapted to meet conditions of practical use.

Since various possible embodiments of the present invention or modifications might be made to the exemplary embodiment set forth above, it is to be understood that the above drawings and descriptions are to be interpreted as illustrative and not in a limiting sense.

Having thus described the invention there is claimed as new and desired to be secured by Letters Patent:

1. A method for preventing piracy of a subscription broadcast intended for reception by authorized subscribers comprising the steps of:
    a) providing a program source including an analog audio signal and a digital video signal;
    b) generating a program datagram from the program source;
    c) embedding hidden decoding instructions within the analog audio signal;
    d) formatting the program datastream;
    e) providing an encryption program for encrypting the formatted datastream;
    f) coordinating the decoding instructions with the encryption program;
    g) transmitting the encrypted datastream to authorized subscribers having unique subscriber identification codes;
    h) providing a decoder including a detection chip, a decryption chip and an identification chip for decoding the subscriber received datastream by:
        i. utilizing the detection chip for detecting the embedded decoding instructions within the analog audio signal;
        ii. utilizing the decoding instructions for reconfiguring a decryption code within the decryption chip;
        iii. further utilizing the decoding instructions for reconfiguring an identification code within the identification chip; and
        iv. communicating information received by the identification chip from the program source to the decryption chip for completing the decryption code to enable access to the datastream.

2. A subscription broadcast security system for providing conditional access to a service provider program source, said program source including a digital video signal and an analog audio signal, said analog audio signal provided with embedded decoding instructions, a code selector for coordinating said decoding instructions with an encryption program, a formatter for formatting the analog audio and digital video signals, an encryptor for encrypting the analog audio and digital video signals in accordance with the encryption program to provide an encrypted datastream, a decoder for decrypting the encrypted datastream, said decoder including an identification chip, a decryption chip and a detection chip, said identification chip being programmed with a plurality of identification codes, said identification codes being unique to each subscriber for authenticating subscriber authorization to access the encrypted datastream, said identification codes further being selectively reconfigured, said decryption chip including a plurality of decryption codes for decoding the encrypted datastream, said decryption codes further being selectively reconfigured, said identification chip being linked to the service provider for receiving instructions for authenticating subscriber authorization and decryption code selection, said identification chip further being in communication with the decryption chip for reconfiguring the decryption code, said detection chip being programmed to detect the embedded decoding instructions within the analog audio signal and for selectively reconfiguring the decryption code to enable decryption access to the datastream with the reconfiguration being a function of the embedded decoding instructions received in the analog audio signal and transmitted by the detection chip and the decryption code selection instructions received from the service provider and transmitted by the identification chip.

3. A subscription broadcast security system as claimed in claim 2 wherein at least one of the identification chip and the decryption chip is further reconfigured as a function of system time.

4. A subscription broadcast security system as claimed in claim 2 further including a flash boot program for loading the decoder, wherein input data from the detection chip is adapted to selectively reconfigure the flash boot program.

5. A subscription broadcast security system as claimed in claim 2 wherein the decryption chip is further programmed to reconfigure the decryption codes in at least one of a fixed or program-timed sequence.

6. A subscription broadcast security system as claimed in claim 2 wherein the decoder includes a field-programmable gate array.

7. A subscription broadcast security system for providing conditional access to a service provider program source as claimed in claim 2 wherein the embedded decoding instructions within the audio signal are used to selectively reconfigure the identification code.

8. A subscription broadcast system for providing conditional access to a service provider program source as claimed in claim 2 wherein the identification chip further includes a plurality of identification codes with a set of identification codes being unique to each subscriber and programmed to constantly change.

* * * * *